United States Patent [19]

Fisher

[11] Patent Number: 4,562,399
[45] Date of Patent: Dec. 31, 1985

[54] BRUSHLESS DC TACHOMETER

[75] Inventor: Robert L. Fisher, Christiansburg, Va.

[73] Assignee: Kollmorgen Technologies Corporation, Dallas, Tex.

[21] Appl. No.: 504,072

[22] Filed: Jun. 14, 1983

[51] Int. Cl.[4] .................... H02K 39/00; H02K 21/12; H02P 9/00; G01P 3/48
[52] U.S. Cl. .................................. 322/94; 310/111; 310/156; 324/174
[58] Field of Search .................. 322/90–94, 322/31; 310/156, 111; 324/163, 164, 174

[56] References Cited

U.S. PATENT DOCUMENTS

| | | | |
|---|---|---|---|
| 3,169,203 | 2/1965 | Lavin et al. | 310/111 X |
| 3,508,094 | 4/1970 | Byrne | 310/111 X |
| 4,088,943 | 5/1978 | Schmidt | 322/94 X |
| 4,364,005 | 12/1982 | Kohzai et al. | 322/94 X |

Primary Examiner—R. J. Hickey
Attorney, Agent, or Firm—Morgan, Finnegan, Pine, Foley & Lee

[57] ABSTRACT

An alternator for use in a brushless DC tachometer which produces are output voltage with a trapezoidal waveshape. The alternator includes a three phase toroidal winding on a plotless core. The windings are concentrated rather than being distributed. The rotor includes high intensity permanent magnets configured to provide uniform flux density over a large segment at least equal to a commutation increment.

12 Claims, 3 Drawing Figures

BRUSHLESS DC TACHOMETER

This invention relates to DC tachometers and, more particularly, to brushless DC tachometers having a low ripple component in the output signal.

BACKGROUND OF THE INVENTION

Tachometers have been used for many years to provide a rate signal in servo control systems or to provide rate damping for system stabilization. In servo systems operating at low speeds the tachometers are normally of the DC brush type which provide an analog voltage having an amplitude proportional to speed. However, brush type tachometers do not perform well at high speeds due to brush bounce and brush wear problems. Digital type tachometers, on the other hand, operate well at high speeds in the range where the digital pulse rate has sufficient band width. The digital tachometers, however, do not perform well at low speeds, particularly at speeds close to zero where the interval between pulses is too great.

An object of this invention is to provide a DC tachometer operable over a wide speed range from substantially zero to high speeds.

Another object is to provide a brushless DC tachometer providing an output voltage proportional to speed over a wide range with relatively little ripple content in the output signal.

SUMMARY OF THE INVENTION

In copending application entitled "Brushless Tachometer" by Philip S. Coulon, Jr., Ser. No. 504,121, filed on even date herewith, a brushless tachometer design is disclosed which provides a substantially linear output signal over a wide range including, particularly, the range near zero. The system disclosed includes an alternator, a position sensor, and a solid state switching circuit. Since there are no brushes or sliding contacts the system is capable of operating well at high speeds.

Normally the signal generated in the individual tachometer windings has a sinusoidal shape which causes an undesirable ripple component to appear in the tachometer output. In a brush type DC tachometer the ripple component can be reduced in magnitude and shifted to a higher frequency by employing a larger number of commutator bars to increase the number of commutation increments per revolution. With solid state switching tachometers, however, this approach is not practical since the number of switching increments is generally proportional to the number of solid state switches required in the system. A typical brushless tachometer may include a three-phase alternator with a six transistor switching bridge. If the windings generate the normal sinusoidal voltages and 60 degree commutation increments are used, the output ripple component would be on the order of 13.5% of the output signal.

It has been found according to this invention that the alternator can be constructed to provide a trapezoidal waveform having a substantially flat portion for at least the duration of the commutation increment. In a three-phase system with 60 degree commutation increments, the desired waveform has a substantially flat characteristic from 60 degrees to 120 degrees and from 240 degrees to 300 degrees. This is achieved according to the preferred embodiment of the invention by forming a three phase toroidal winding on a slotless core. The winding for each phase is concentrated into a small arcuate segment rather than being distributed around the core. The rotor includes high intensity permanent magnets configured to provide a uniform flux density over a large segment at least equal to a commutation increment. The core structure for the winding is preferably a very low reluctance material such as can be achieved using ferrites or amorphous ferromagnetic materials.

A BRIEF DESCRIPTION OF THE DRAWINGS

The foregoing objects and other objects will become apparent from the following detailed specification which sets forth an illustrative embodiment of the invention. The drawings form part of the specification wherein.

DETAILED DESCRIPTION OF THE INVENTION

Figure 1:
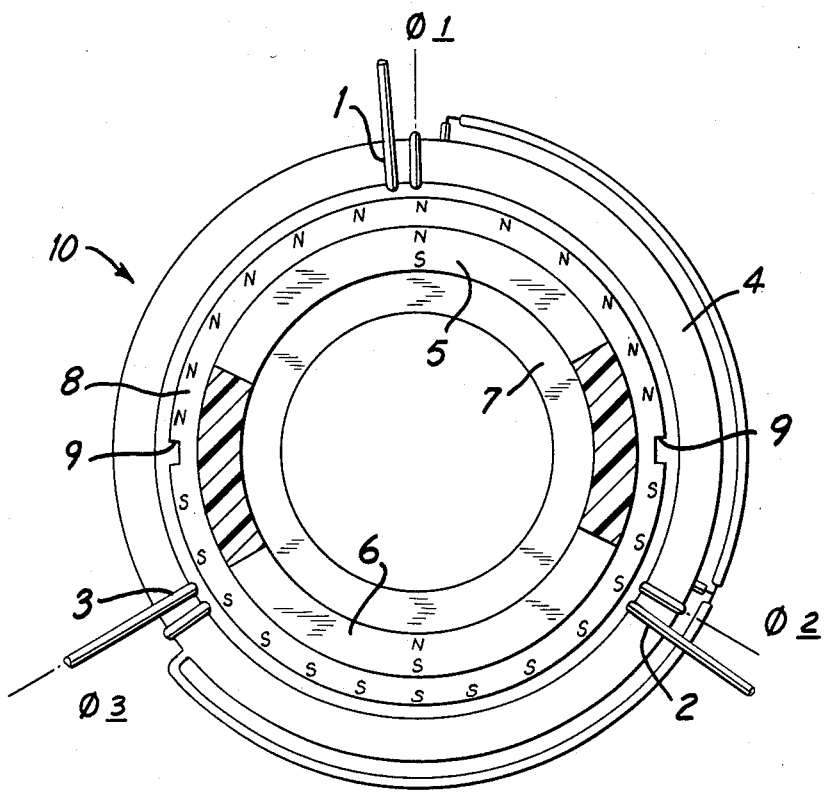
FIG. 1 is a cross-sectional view showing the magnetic structure for the DC tachometer according to the invention.

The alternator structure for the Brushless DC Tachometer according to the invention is illustrated in FIG. 1.

Three separate phase windings 1, 2 and 3 are toroidally wound around a stator core ring 4. Each winding is concentrated into as small an arc segment as is possible rather than being distributed around the core in customary fashion. Windings 1–3 are interconnected into a Wye configuration.

The stator core ring can be made of any suitable high permeability, low reluctance magnetic material. Since the stator core is in the form of a ring it can be conveniently made from an amorphous ferromagnetic material produced by extremely rapid cooling of a molten film alloy (for example an iron-silicon alloy) such that the material does not have time to form a structured lattice. Such materials are available in ring shaped cores from Allied Chemical Co. under the tradename METGLASS. Amphorous ferrormagnetic materials would provide a core with exceptionally low magnetic losses. Ferrites are also preferred core materials such as manganese zinc ferrite available from Ferroxcube Div. of Amperex Electronic Corp. The ferrite material can be formed into the desired ring configuration by sintering or molding.

The windings are preferably wound on a smooth ring which does not include winding slots. The lack of slots in the magnetic stator structure is preferable in achieving the desired trapzoidal waveform.

The rotor for the alternator structure includes two arcuate permanent magnets 5 and 6. The permanent magnets are mounted on a cylindrical steel hub 7 and are surrounded by a magnetic outer cylinder 8 also made of steel. The magnetic outer cylinder distributes the pole faces over approximately 180 degrees. Slots 9 are machined into the cylinder 180 degrees apart to provide flux concentration so as to increase the flux density in the areas toward the edges of the magnets and immediately beyond the magnets. The air gap between the outer magnetic cylinder 8 and stator core 4 is substantially uniform. As a result, the magnetic flux density is substantially uniform in the air gap for most of the 180 degree segment The permanent magnets are preferably of the high intensity type such as Alnico or rare earth samarium-cobalt magnets. These magnets are capable of achieving high flux densities over a relatively large air gap such as is present in the structure being described wherein the stator does not include winding slots.

Figure 2:
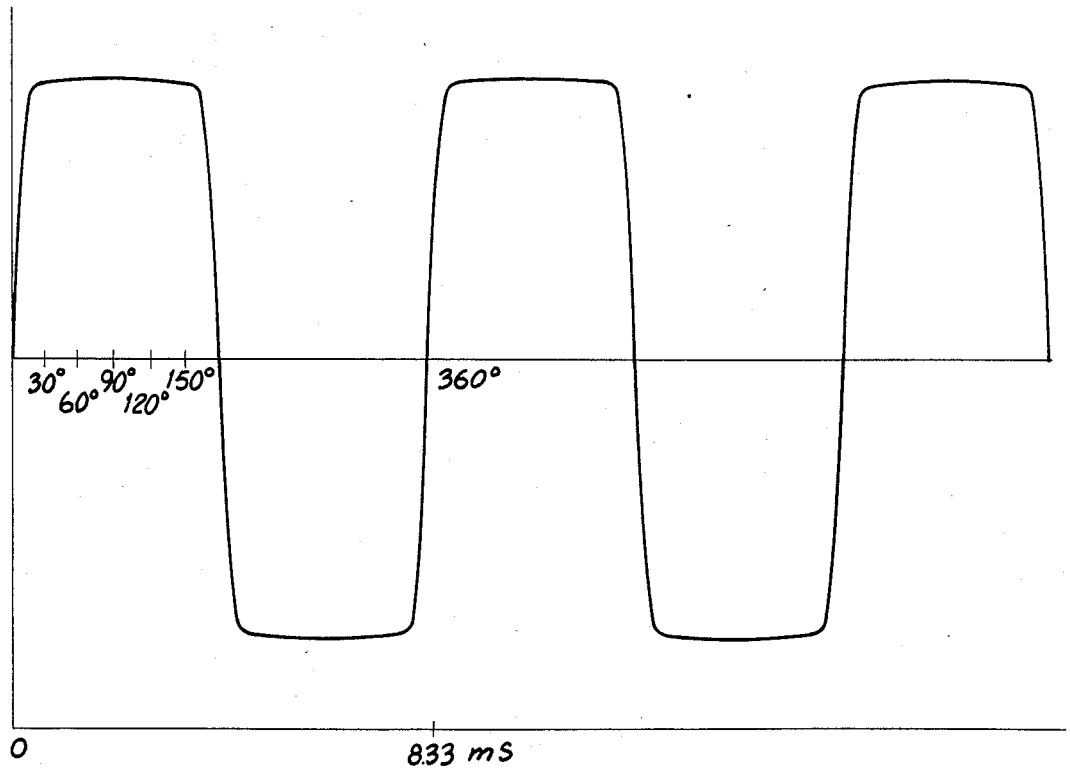
FIG. 2 illustrates the trapezoidal waveform produced by the alternator portion of the tachometer.

The wave form of the signal produced by each of the individual windings is as shown in FIG. 2. It should be noted that the wave shape is substantially flattened at the peaks and is relatively constant for a commutation segments greater than 60-120 degrees and 240-300 degrees.

Figure 3:
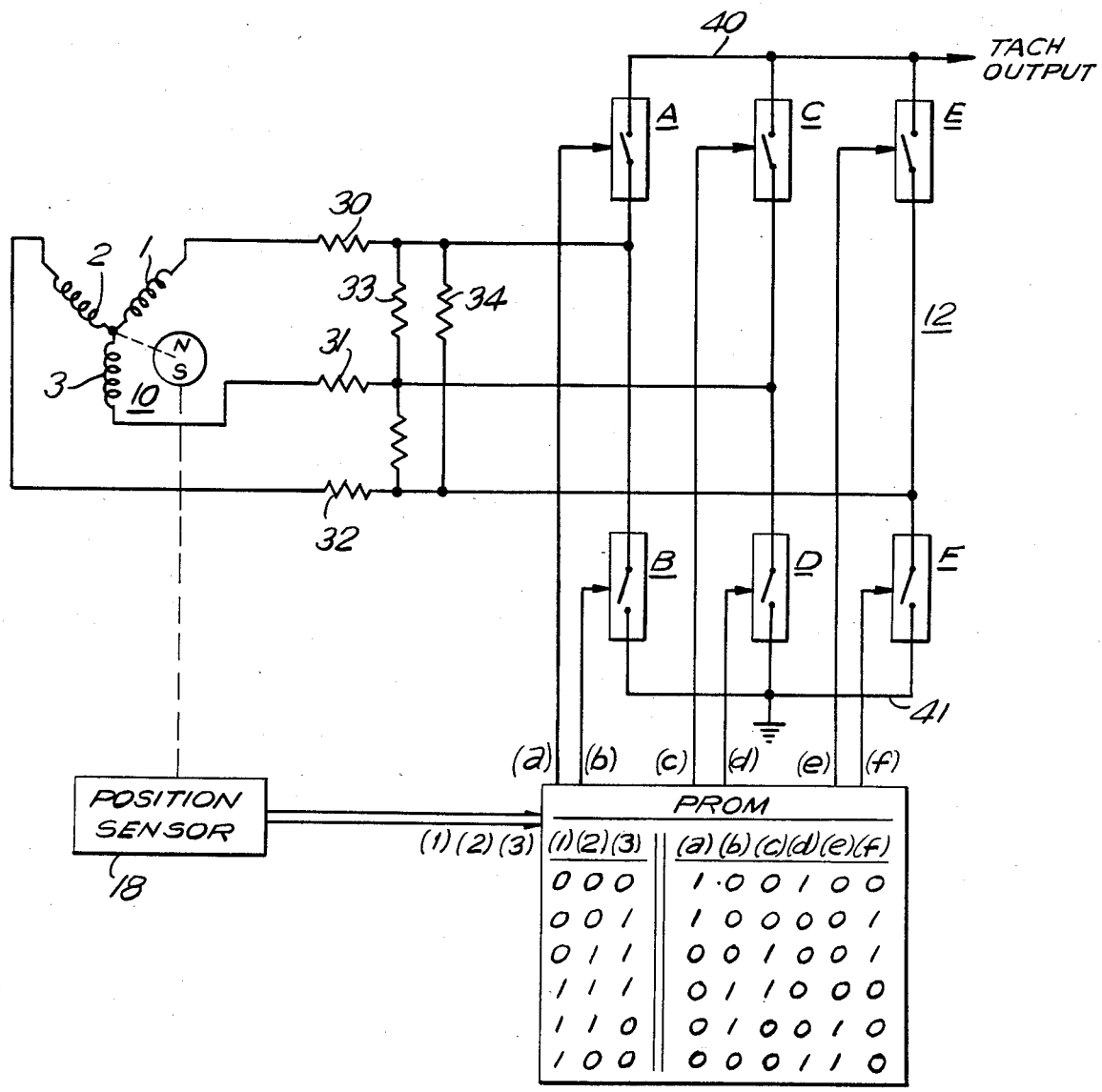
FIG. 3 is a schematic diagram illustrating switching circuits for the tachometer according to the invention.

FIG. 3 is a schematic illustration of a DC tachometer of the invention including alternator 10 as described in FIG. 1. The tachometer system includes alternator 10 coupled to a six transistor switching bridge 12 via a voltage divider network 14. The switching logic is provided by a programmable read only memory (PROM) 16 addressed by a rotor position sensor 18.

More particularly, the alternator includes stator windings 1, 2, and 3 connected in a three-phase Wye configuration and the permanent magnet rotor. The rotor is mechanically coupled to position sensor 18 which can be a conventional array of Hall sensors arranged to provide a six position indication in three digit code. Other types of position sensors can also be used such as optical or magnetic encoders The three digit position code from position sensor 18 is supplied as the address input, (1), (2) and (3), to a 3×6 PROM 16. The logic table stored in PROM 16 is shown in FIG. 3. For example, if the input address from the position sensor is "000", as in the top line of the table, the digital word "100100" appears on the six output lines (a) to (f) meaning that lines (a) and (d) are high ("1") and that the remaining lines are low ("0").

Resistors 30-35 make up the three phase voltage divider network. Resistors 30-32 are connected in series in the lines between the windings of alternator 10 and the switches of switching bridge circuit 12. Resistors 33-35 are connected between the three-phase lines. The resistance values are selected to reduce the alternator output voltages to values within the range that can be handled by the switching transistors.

Transistor bridge 12 is made up of field effect transistors (FET's) such as RCA CD 4066B which are CMOS (complementary metal oxide semiconductor) bilateral switches. These transistors are available at modest cost and have adequate capacity for most tachometer applications. The peak controllable voltage is in the range between +8 volts and −8 volts. The one end of winding 1 is connected to switches A and B in bridge circuit 12 via resistor 30, whereas one end of winding 2 is connected to switches C and D via resistor 31 and one end of winding 3 is connected to switches E and F via resistor 32. The other ends of windings 1-3 are connected to a common Wye junction. Output lines (a) to (f) from PROM 16 are connected to control the conductive states of transistor switches A to F, respectively. Switches B, D and F are connected to a common ground connection 41 whereas switches A, C and E are connected to a common tachometer output line 40.

In operation, the position sensor and PROM 16 render the switches conductive in pairs according to rotor position to provide a DC signal with a value and polarity proportional to the rotor speed and direction. It is significant that FET's are used in the switching bridge since these transistors do not have a threshold offset as is the case with the normal transistor. As a result, the output voltage is proportional to speed throughout the range of operation and particularly in the range near zero.

With a three-phase alternator in combination with a six transistor bridge as shown in FIGS. 1 and 3, the commutation increments are 60 electrical degrees. The threephase output signals are displaced by one another by 120 degrees. Each output signal is connected to the output lines by the switching bridge from 60-120 degrees and from 240-300 degrees, that is, during the respective commutation intervals.

During each revolution (360 electrical degrees), a winding passes through the magnetic fields produced by rotor magnets. As previously mentioned, the magnetic fields are designed to be uniform over a substantial segment. As the winding enters the uniform field segment the potential generated therein increases. Likewise, as the winding leaves the uniform magnetic field segment, the potential generated therein decreases. During the interval after the winding has entered the uniform field segment and before the winding begins to leave this segment the generated potential is substantially constant and, hence, should be equal to the commutation interval.

If the voltage being commutated to produce the tachometer output originates from a single winding, such as from the windings of a grounded neutral, three phase, wye configuration, the criterion for the preferred operation is:

$$C \leq M - 2(W + A)$$

where C is the commutation angle, M is the angular span over which the magnets produce a uniform field, W is the angular span of the winding and A is the equivalent angular span of the air gap dimension. Typically the air gap is in the range of 10-20 thousandths of an inch. In the equation, A is an angular dimension equal to the air gap and is included in the equation due to fringing effects in the magnetic field at the ends of the magnets. Thus, the uniform magnetic field should cover a distance at least equal to the commutation interval plus twice the width of the winding plus the distance at each end of the field where fringing effects occur.

If the voltage being commutated to produce the tachometer output originates from several windings, such as would be the case in delta or nongrounded wye configurations, the criterion must further take into account the phase displacement between the contributing windings. Thus the criterion for the preferred operation becomes:

$$C \leq M - 2(W + A) + P$$

where P is the angular displacement between the windings contributing to the tachometer output voltage.

Although only a single preferred embodiment is described in detail, it should be obvious that there are other variations within the scope of this invention. The invention is more particularly defined in the appended claims.

I claim:

1. In a DC tachometer, the combination of
a magnetic core;
a plurality of concentrated toroidal windings on said core separated from one another;

a magnetic structure including at least one permanent magnet for establishing a magnetic field across an air gap between said structure and said core;

commutation switching means for connecting said windings to provide an output for predetermined commutation intervals; and wherein said magnetic structure provides a substantially uniform flux density in said air gap during said commutation intervals.

2. A DC tachometer according to claim 1 wherein said magnetic core is stationary and said magnetic structure rotates.

3. A DC tachometer according to claim 1 wherein said magnetic structure provides a substantially uniform flux density over a segment of said air gap at least equal to the distance traveled by one of said windings during a commuation interval plus twice the width of said winding.

4. In a DC tachometer, the combination of a magnetic core;

a plurality of concentrated toroidal windings on said core separated from one another;

a magnetic structure including at least one permanent magnet for establishing a magnetic field across an air gap between said structure and said core;

commutation switching means for connecting said windings to provide an output for predetermined commutation intervals;

wherein said magnetic structure provides a substantially uniform flux density in said air gap during said commutation intervals; and said windings being interconnected in a grounded neutral, wye configuration, and wherein $$C \leq M - 2(W+A)$$

where C is the commutation angle, M is the angular span over which said magnetic structure provides said substantially uniform flux density, W is the angular width of said windings and A is the equivalent angular span of the air gap.

5. In a DC tachometer, the combination of a magnetic core;

a plurality of concentrated toroidal windings on said core separated from one another;

a magnetic structure including at least one permanent magnet for establishing a magnetic field across an air gap between said structure and said core;

commutation switching means for connecting said windings to provide an output for predetermined commutation intervals;

wherein said magnetic structure provides a substantially uniform flux density in said air gap during said commutation intervals; and said windings being interconnected such that more than one winding at a time contributes to the tachometer output and wherein $$C \leq M - 2(W+A) - P$$

where C is the commutation angle, M is the angular span over which said magnetic structure provides said substantially uniform flux density, W is the angular width of said windings, A is the equivalent angular span of the air gap and P is the angular displacement between the contributing windings.

6. A DC tachometer according to claim 1 wherein said core is made from a ferrite material.

7. A DC tachometer according to claim 1 wherein said core is made from an amorphous magnetic material.

8. A DC tachometer according to claim 1 wherein said permanent magnet is a rare earth samarium-cobalt magnet.

9. A brushless DC tachometer of the type including an alternator with windings for generating an alternating signal proportional to speed, a rotor position sensor, and a solid state switching circuit for connecting said windings, respectively, to provide an output during commutation intervals determined by the rotor position sensor, the improvement comprising:

an alternator including;

a magnetic stator core;

a plurality of toroidal windings on said core separated from one another; and a rotating magnetic structure including at least one permanent magnet for establishing a magnetic field across an air gap between said magnetic structure and said core, and wherein said magnetic structure provides a substantially uniform flux density in said air gap during the commutation interval for each winding.

10. A brushless DC tachometer according to claim 9 said magnetic structure provides a substantially uniform flux density over a segment of said air gap at least equal to the distance traveled by one of said windings during a commutation interval plus twice the width of said winding.

11. A brushless DC tachometer according to claim 9 wherein said toroidal windings are interconnected into a three-phase configuration and wherein said commutation intervals are 60 electrical degrees.

12. A brushless DC tachometer according to claim 9 wherein said windings generate a signal having a generally trapezoidal waveform with the flat portions thereof being at least equal to said commutation intervals.

* * * * *

UNITED STATES PATENT AND TRADEMARK OFFICE
CERTIFICATE OF CORRECTION

PATENT NO. : 4,562,399

DATED : December 31, 1985

INVENTOR(S) : Robert L. Fisher

It is certified that error appears in the above-identified patent and that said Letters Patent is hereby corrected as shown below:

Title page:

In the Abstract, line 4, "plotless" should be --slotless--.

Signed and Sealed this

Sixth Day of May 1986

[SEAL]

Attest:

DONALD J. QUIGG

Attesting Officer

Commissioner of Patents and Trademarks